(12) United States Patent
Kiester et al.

(10) Patent No.: US 9,889,799 B1
(45) Date of Patent: Feb. 13, 2018

(54) COMPARTMENT DOOR KEY CATCHER

(71) Applicant: GM GLOBAL TECHNOLOGY OPERATIONS LLC, Detroit, MI (US)

(72) Inventors: Timothy A. Kiester, Sterling Heights, MI (US); Douglas J. Amick, Troy, MI (US); Kenton L. West, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 13 days.

(21) Appl. No.: 15/235,712

(22) Filed: Aug. 12, 2016

(51) Int. Cl.
*B60R 13/00* (2006.01)
*B60R 7/04* (2006.01)
*B60R 13/02* (2006.01)

(52) U.S. Cl.
CPC .......... *B60R 7/043* (2013.01); *B60R 13/0262* (2013.01)

(58) Field of Classification Search
CPC ......... E05Y 2900/531; F25D 2323/021; F25D 23/087; F25D 23/069; F25D 23/126; H01H 9/22; Y10T 292/1082; B60P 1/26; B60P 1/28; B60P 3/05; B60R 7/043; B60R 13/0262
USPC ................................... 296/24.34, 37.8, 37.1
See application file for complete search history.

(56) References Cited

U.S. PATENT DOCUMENTS

| | | | | |
|---|---|---|---|---|
| 7,168,750 B2* | 1/2007 | Hutek | ..................... | B60N 2/464 296/24.34 |
| 7,396,062 B2* | 7/2008 | Hung | ................. | B60H 1/00564 296/24.34 |
| 7,513,007 B2* | 4/2009 | Chernoff | ................... | A47L 5/24 15/313 |
| 7,513,553 B2* | 4/2009 | Singh | ....................... | B60N 3/08 296/37.8 |
| 7,810,969 B2* | 10/2010 | Blackmore | .......... | B60N 2/4686 362/459 |
| 8,074,832 B2* | 12/2011 | Fujiwara | ............... | B60N 2/4686 220/811 |
| 8,573,665 B2* | 11/2013 | Hipshier | ................ | B60Q 3/225 296/24.34 |
| 8,910,990 B1* | 12/2014 | Oldani | .................... | B60R 11/02 220/260 |
| 8,919,847 B2* | 12/2014 | Mather | ................ | B60N 2/4606 296/24.34 |
| 8,939,491 B2* | 1/2015 | Gillis | ..................... | B60N 3/101 296/24.34 |
| 9,140,044 B2* | 9/2015 | Singh | ........................ | E05D 7/02 |
| 9,387,808 B2* | 7/2016 | Kearney | ................... | B60R 7/04 |

(Continued)

*Primary Examiner* — Kiran B Patel
(74) *Attorney, Agent, or Firm* — Quinn IP Law

(57) ABSTRACT

A key catcher for a storage unit including a trim panel, a compartment housing, and an openable compartment door having a length and an outer surface includes a sweeper and a biasing member. The sweeper is connected to the compartment housing and is configured to conform to the outer surface of the compartment door along the length of the compartment door. The biasing member is connected to the compartment housing and the sweeper and is configured to urge the sweeper toward the outer surface of the compartment door. The sweeper contacts the outer surface of the compartment door along the length of the compartment door when the compartment door is in an open position, a closed position, and any position between the open and closed positions such that a small item, such as a key, credit card, or change, cannot fall between the openable door and the trim panel.

18 Claims, 4 Drawing Sheets

(56) References Cited

U.S. PATENT DOCUMENTS

| | | | | |
|---|---|---|---|---|
| 9,457,696 B2* | 10/2016 | Dyle | ................... | B60N 2/4626 |
| 2008/0079278 A1* | 4/2008 | Rajappa | ................... | B60R 7/04 |
| | | | | 296/24.34 |
| 2013/0320689 A1* | 12/2013 | Hishon | ................. | B60N 3/101 |
| | | | | 296/24.34 |
| 2015/0069776 A1* | 3/2015 | Ishibashi | .................. | B60R 7/04 |
| | | | | 296/24.34 |
| 2016/0229603 A1* | 8/2016 | Amick | .............. | A47G 23/0216 |

* cited by examiner

COMPARTMENT DOOR KEY CATCHER

TECHNICAL FIELD

This disclosure relates to a compartment door key catcher.

BACKGROUND

A vehicle may include a console or storage unit including a trim panel and a compartment, such as a cup holder, having an openable door. Keys, coins, credit cards, business cards, and other small items may fall through an opening between the openable door and the trim panel when the openable door is in a closed position, an open position, or being moved between the closed and open positions.

SUMMARY

A key catcher and a vehicle are disclosed herein. The key catcher is for a storage unit including a trim panel, a compartment housing connected to the trim panel, and an openable compartment door connected to the compartment housing and having a length and an outer surface. The key catcher includes a sweeper and a biasing member. The sweeper is connected to the compartment housing and is configured to conform to the outer surface of the compartment door along the length of the compartment door. The biasing member is connected to the compartment housing and to the sweeper and is configured to urge the sweeper toward the outer surface of the compartment door. The sweeper contacts the outer surface of the compartment door along the length of the compartment door when the compartment door is in an open position, a closed position, and any position between the open and closed positions such that a small item, such as a key, credit card, or change, cannot fall between the openable door and the trim panel.

The vehicle has a storage unit and a key catcher. The storage unit includes a trim panel, a compartment housing, and an openable compartment door. The compartment housing is connected to the trim panel. The openable compartment door is connected to the compartment housing via a hinge. The openable compartment door has a length and an outer surface. The key catcher includes a sweeper and a biasing member. The sweeper is connected to the compartment housing and is configured to conform to the outer surface of the compartment door along the length of the compartment door. The biasing member is connected to the compartment housing and to the sweeper and is configured to urge the sweeper toward the outer surface of the compartment door. The sweeper contacts the outer surface of the compartment door along the length of the compartment door when the compartment door is in an open position, a closed position, and any position between the open and closed positions such that a small item, such as a key, credit card, or change, cannot fall between the openable door and the trim panel.

The key catcher and the vehicle disclosed herein prevent a small item, such as a key, credit card, or change, from falling between the openable door and the trim panel. This disclosure applies to any machine or manufacture having a storage compartment with an openable door. This disclosure applies to any vehicle, including but not limited to cars, trucks, vans, all-terrain vehicles, busses, boats, trains, airplanes, manufacturing vehicles and equipment, construction vehicles and equipment, maintenance vehicles and equipment, etc.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
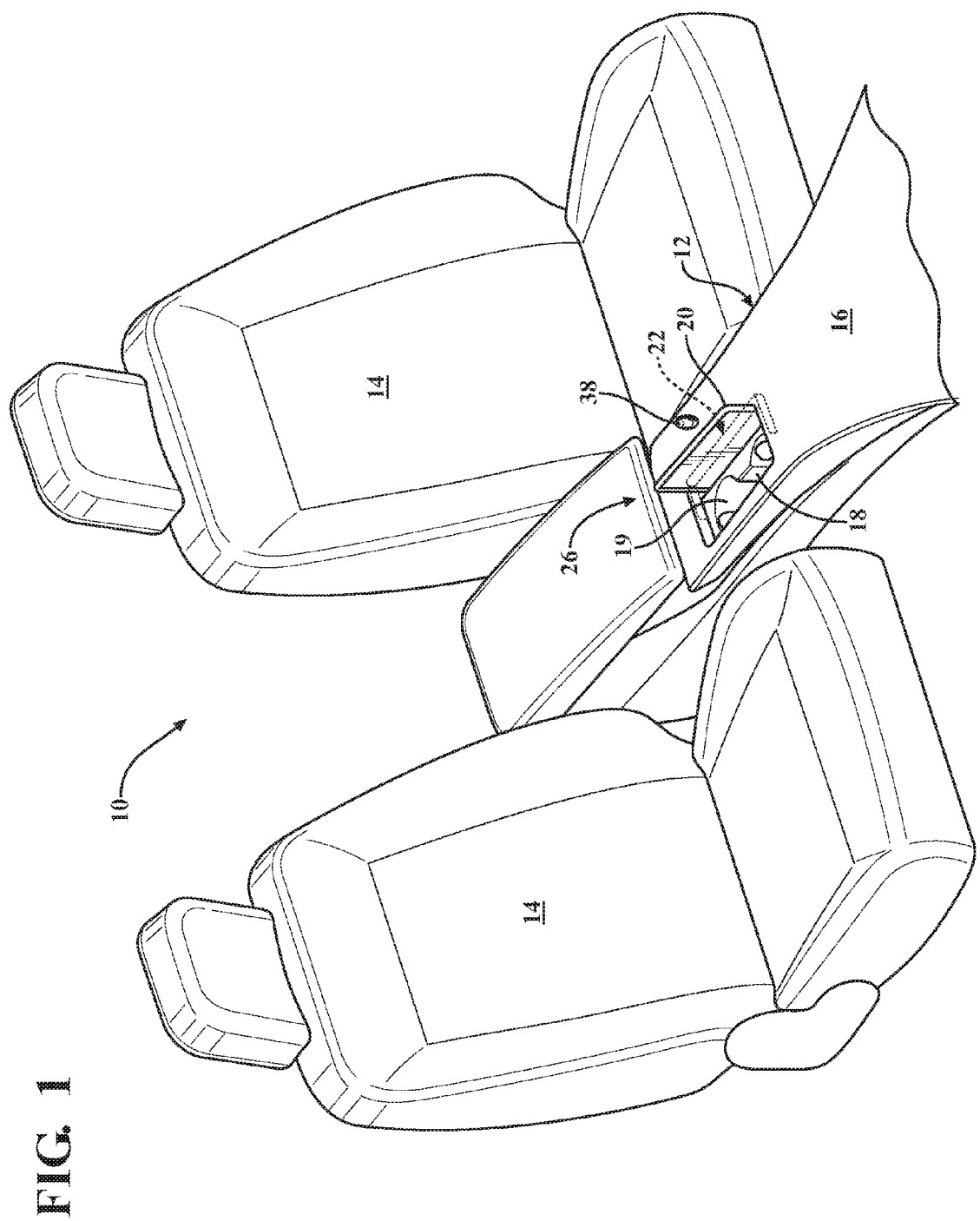
FIG. 1 is a fragmentary, schematic, perspective illustration of a vehicle having a storage unit with an openable compartment door in an open position and a key catcher of this disclosure.

Referring to the drawings, wherein like reference numbers refer to like components throughout the views, FIG. 1 shows an example vehicle 10. The vehicle 10 includes a key catcher assembly 22 of the type disclosed herein. While the vehicle 10 of FIG. 1 is a typical example application suitable for the key catcher 22 disclosed herein, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the key catcher 22 to such an embodiment.

The vehicle 10 includes a console or storage unit 12 and may include a seat 14. The storage unit 12 may be a center or floor console and may be located next to a seat 14 or between two seats 14, as shown. The console or storage unit 12 may be attached to a floor (not shown) of the vehicle 10. The storage unit 12 may be located in any other part of the vehicle 10, including, but not limited to, a door (not shown), the seat 14, an instrument panel (not shown), and a cargo area (not shown) such as a trunk or truck bed.

The storage unit 12 includes a trim panel 16, a retainer or compartment housing 18, an openable compartment door 20, and the key catcher assembly 22. The retainer or compartment housing 18 forms a storage space or compartment 19 in the storage unit 12. The compartment housing 18 may be configured to form a coverable holder such as a cup holder, as shown, or may be configured to form any other general purpose or special purpose storage compartment 19. For example, the compartment housing 18 may form a storage compartment 19 that is configured as a cuboid or box shape to accommodate miscellaneous items, such as pens, paper, maps, small tools, etc. The compartment housing 18 is connected to the trim panel 16. The compartment housing 18 may be connected to the trim panel via a structural bracket (not shown) included in the storage unit 12.

Figure 2A:
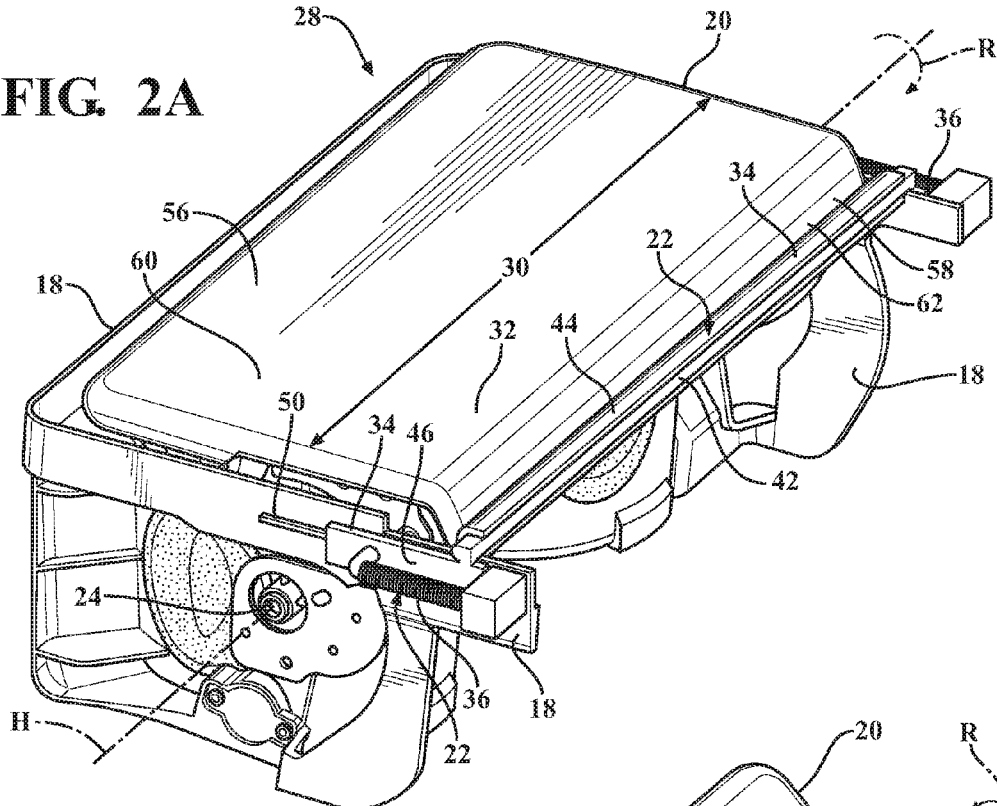
FIG. 2A is a schematic, perspective illustration of the key catcher of FIG. 1 with the openable compartment door a closed position.
Figure 2B:
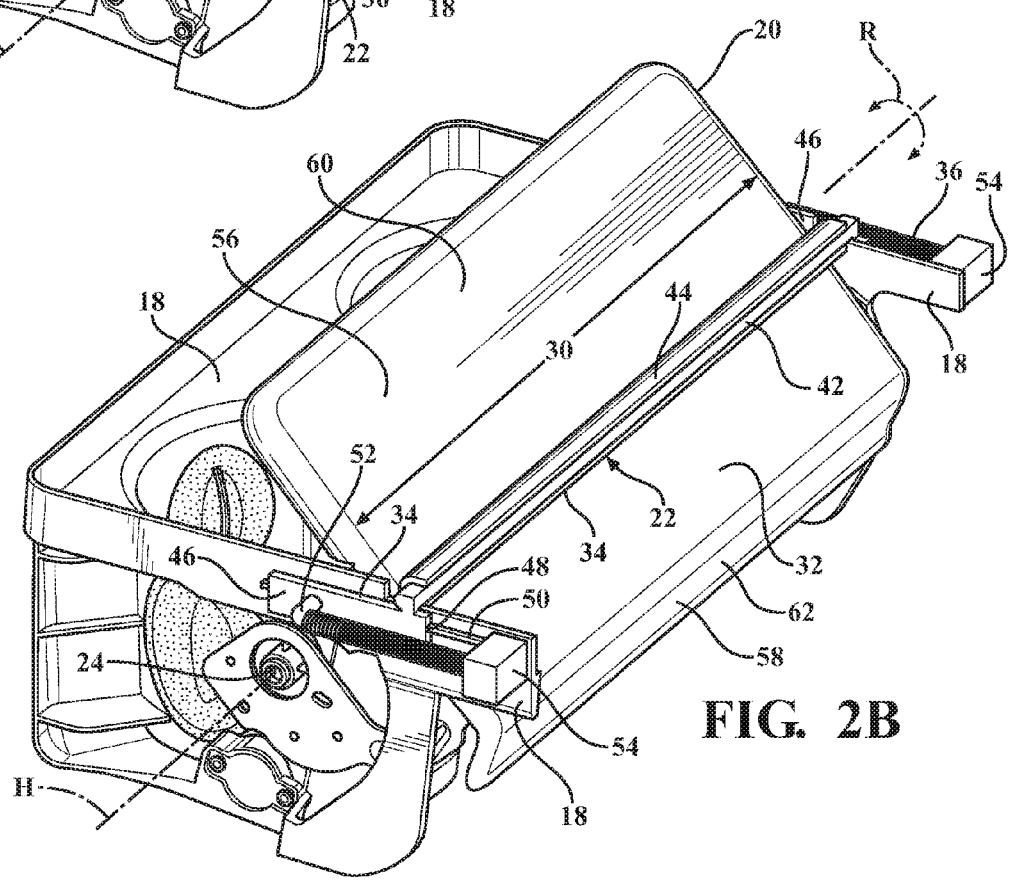
FIG. 2B is a schematic, perspective illustration of the key catcher of FIG. 1 with the openable compartment door between the closed position and the open position.
Figure 2C:
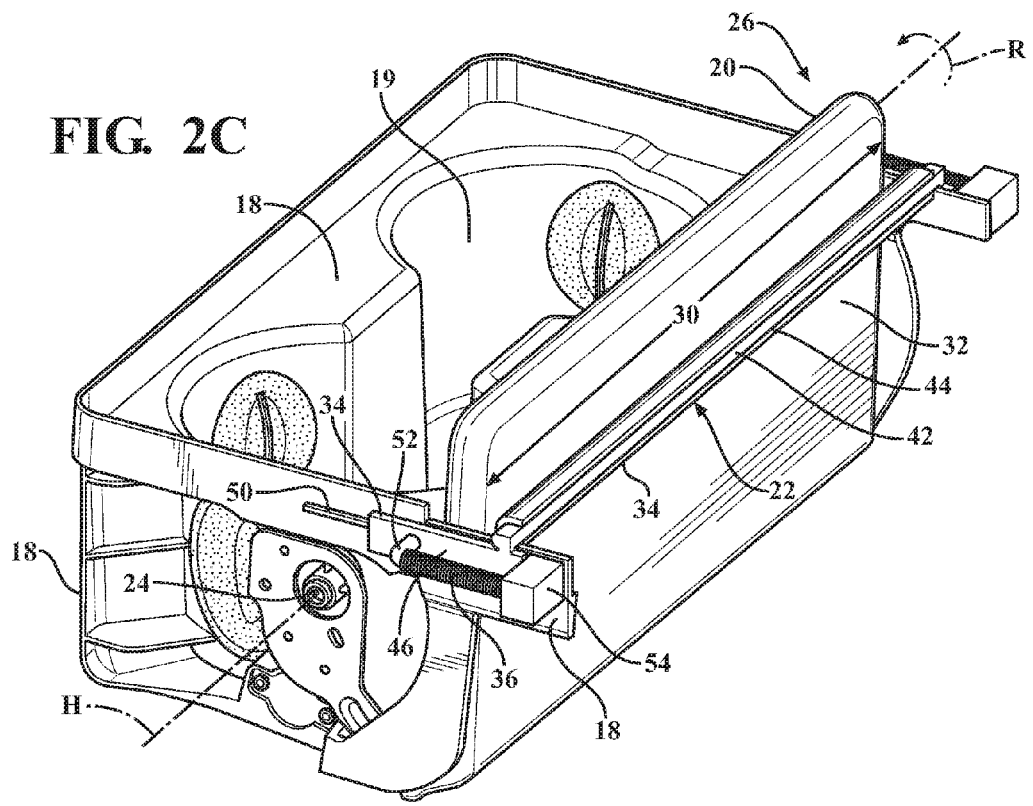
FIG. 2C is a schematic, perspective illustration of the key catcher of FIG. 1 with the openable compartment door in the open position.
Figure 3:
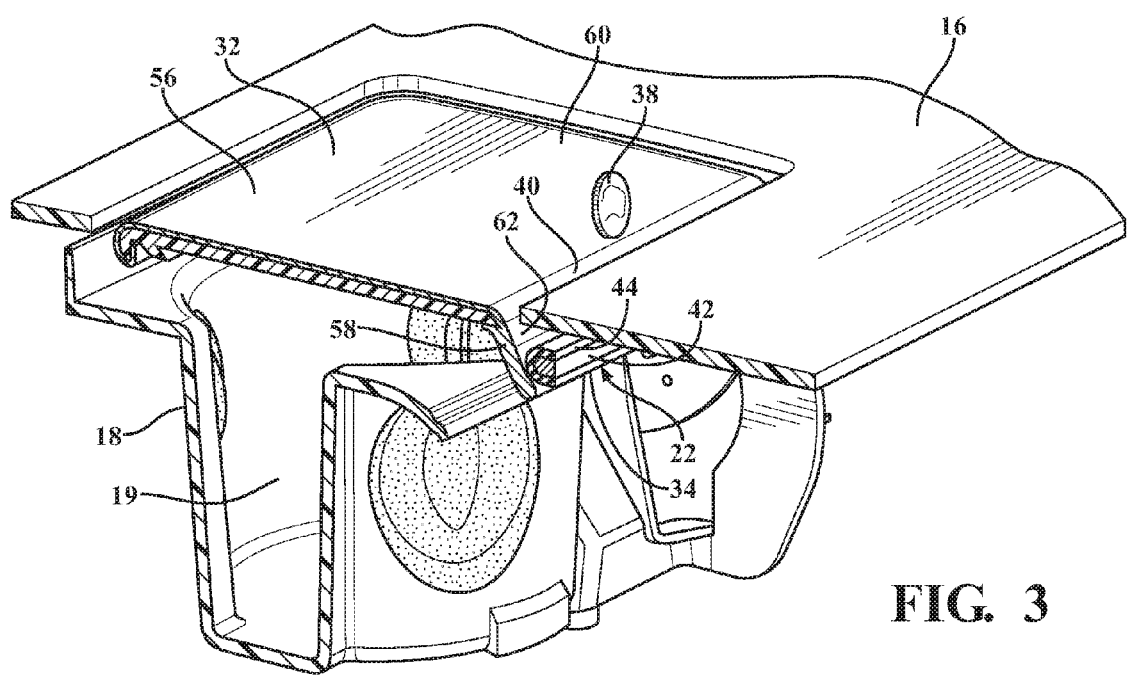
FIG. 3 is a schematic, perspective, cross-sectional illustration, partially in elevation, of the key catcher of FIG. 1 with the openable compartment door in the closed position.
Figure 4:
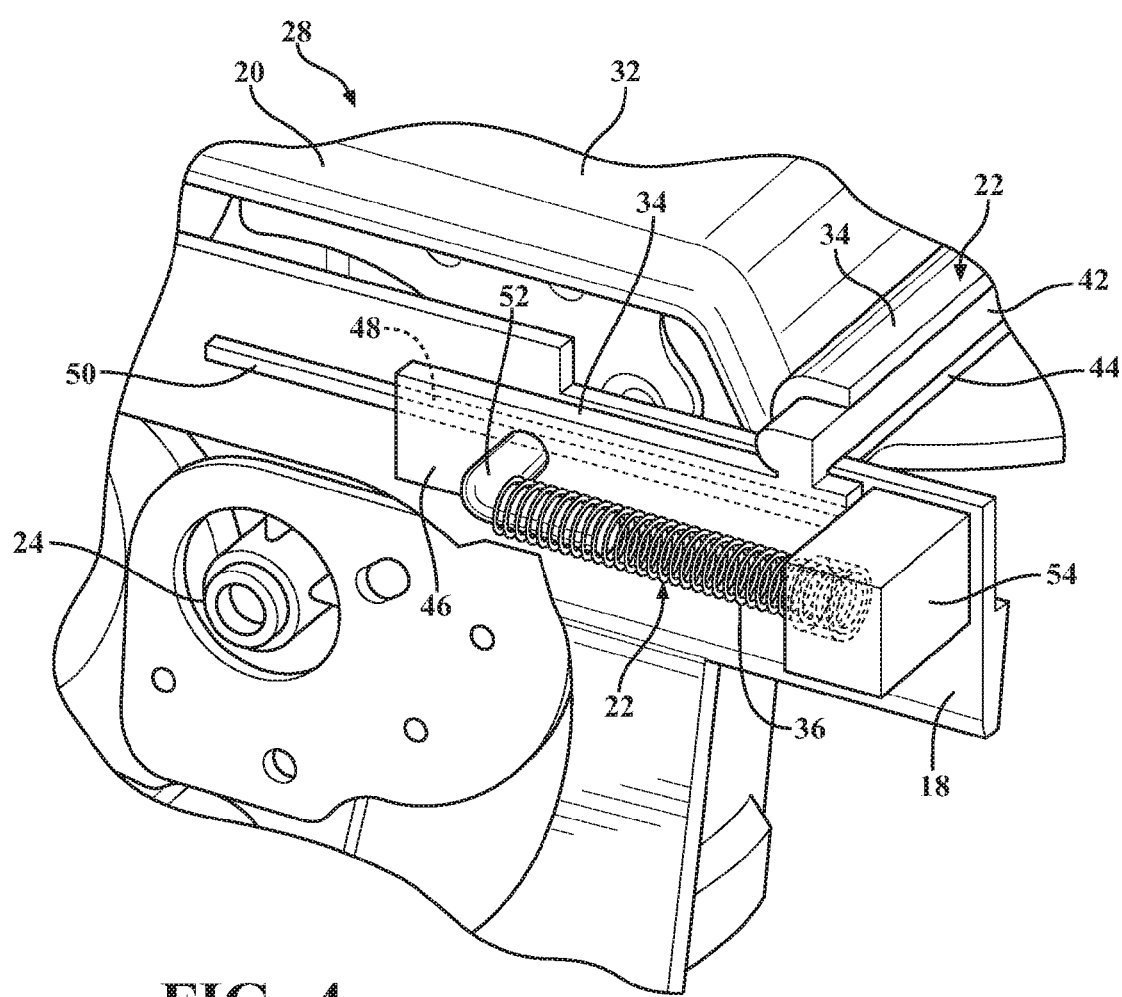
FIG. 4 is a fragmentary, schematic, perspective illustration of the key catcher of FIG. 1 with the openable compartment door in the closed position.

Referring now to FIGS. 1-3, the openable compartment door 20 is connected to the compartment housing 18. The openable compartment door 20 may be connected to the compartment housing 18 via a hinge 24. The hinge 24 may be configured to enable a rotation (arrow R) of the openable compartment door 20 between an open position 26 and a closed position 28. The hinge 24 may have a hinge axis (axis H), on which the openable compartment door 20 rotates between the open position 26 and the closed position 28. The openable compartment door 20 has a length 30 and an outer surface 32. The length 30 of the compartment door 20 may be parallel to the hinge axis (axis H), as shown.

The key catcher assembly 22 includes a sweeper 34 and a biasing member 36. The sweeper 34 is connected to the compartment housing 18 and is configured to conform to the outer surface 32 of the openable compartment door 20 along the length 30 of the openable compartment door 20. The biasing member 36 is connected to the compartment housing 18 and to the sweeper 34 and is configured to urge the sweeper 34 toward the outer surface 32 of the openable compartment door 20.

The sweeper 34 contacts the outer surface 32 of the compartment door 20 along the length 30 of the compartment door 20 when the compartment door 20 is in the open position 26, the closed position 28, and any position between the open position 26 and the closed positions 28 such that a small item 38, such as a key, credit card, or change, cannot fall between the compartment door 20 and the trim panel 16. Referring specifically to FIG. 3, the sweeper 34 may extend across a gap 40 formed between the compartment door 20 and the trim panel 16 when the compartment door 20 is in the open position 26, the closed position 28, and any position between the open position 26 and the closed positions 28 such that the small item 38 cannot fall between the compartment door 20 and the trim panel 16. The key catcher 22 may prevent the small item 38 from falling between the compartment door 20 and the trim panel 16 and into the console or storage unit 12 outside of the compartment housing 18, where it would be difficult to retrieve.

Referring now specifically to FIGS. 2A-2C, the sweeper 34 is shown maintaining contact with the outer surface 32 of the compartment door 20 along the length 30 of the compartment door 20 as the compartment door 20 is moved from the closed position 28, as shown in FIG. 2A, to any position between the closed position 28 and the open position, as shown in FIG. 2B, to the open position 26, as shown in FIG. 2C. This continuous contact between the sweeper 34 and the outer surface 32 of the compartment door 20 prevents the small item 38 from falling between the compartment door 20 and the trim panel 16 when the compartment door 20 in the closed position 28, the open position 26, and any position between the closed position 28 and the open position 26. Similarly, the sweeper maintains contact with the outer surface 32 of the compartment door 20 along the length 30 of the compartment door 20 as the compartment door 20 is moved from the closed position 28 to the open position 26, as shown in the reverse sequence of FIGS. 2A-2C.

Referring now to FIGS. 2A-3, the sweeper 34 may include a bar portion 42. The bar portion 42 of the sweeper 34 may be configured to conform to the outer surface 32 of the compartment door 20 along the length 30 of the compartment door 20. The bar portion 42 of the sweeper 34 may contact the outer surface 32 of the compartment door 20 along the length 30 of the compartment door 20 when the compartment door 20 is in the open position 26, the closed position 28, and any position between the open position 26 and the closed position 28. The sweeper 34 may include a door contact portion 44. The door contact portion 44 may be configured to conform to the outer surface 32 of the compartment door 20 along the length 30 of the compartment door 20. The door contact portion 44 may contact the outer surface 32 of the compartment door 20 along the length 30 of the compartment door 20 when the compartment door 20 is in the open position 26, the closed position 28, and any position between the open position 26 and the closed position 28.

The door contact portion 44 of the sweeper 34 may be made of a non-metal material configured to prevent scratching and wear of the outer surface 32 of the compartment door 20. The non-metal material of the door contact portion 44 of the sweeper 34 may be further defined as a rubber material. The bar portion 42 of the sweeper 34 may be made of a non-metal material. The non-metal material of the bar portion 42 of the sweeper 34 may be further defined as a plastic material. The door contact portion 44 of the sweeper 34 may be co-molded with the bar portion 42 of the sweeper 34. Alternatively, the door contact portion 44 of the sweeper 34 may be attached to the bar portion 42 of the sweeper 34 via an adhesive (not shown) or via any other suitable attachment.

Referring now to FIGS. 2A-4, the sweeper 34 may include a guide arm portion 46 having a first guide feature 48. The compartment housing 18 may include a second guide feature 50. The first guide feature 48, the second guide feature 50, and the biasing member 36 may cooperate such that the sweeper 34 contacts the outer surface 32 of the compartment door 20 along the length 30 of the compartment door 20 when the compartment door 20 is in the open position 26, the closed position 28, and any position between the open position 26 and the closed position 28. One of the guide features 48, 50 may be a rail, as shown in second guide feature 50. The other of the guide features 48, 50 may be a channel, as shown in the first guide feature 48, configured to slide along the rail to guide the motion of the sweeper 34 as the compartment door 20 is moved between the open position 26 and the closed position 28. The first and second guide features 48, 50 may have a rectangular shape in cross-section. Other configurations of guide features 48, 50 may be used as appropriate.

The sweeper 34 may include a first biasing member attachment feature 52. The compartment housing 18 may include a second biasing member attachment feature 54. The biasing member 36 may be connected to the first biasing member attachment feature 52 and to the second biasing member attachment feature 54. The biasing member 36 may be further defined as a compression coil spring, as shown. Other types and configurations of biasing members 36 and biasing member attachment features 52, 54 may be used as appropriate.

The openable door 20 may include a cover portion 56 and a hider portion 58. The cover portion 56 may be configured to cover the compartment housing 18 and the storage compartment 19 when the openable door 20 is in the closed position 28. The hider portion 58 may be configured to extend across the gap 40 formed between the compartment door 20 and the trim panel 16 when the openable door 20 is in the closed position 28. The outer surface 32 of the openable door 20 may respectively include a cover portion outer surface 60 and a hider portion outer surface 62.

The sweeper 34 may contact the hider portion outer surface 62 of the compartment door 20 along the length 30 of the compartment door 20 when the compartment door 20 is in the closed position 28. The sweeper 34 may contact the cover portion outer surface 60 of the compartment door 20 along the length 30 of the compartment door 20 when the compartment door 20 is in the open position 26. The sweeper 34 may contact one of the hider portion outer surface 62 and the cover portion outer surface 60 of the compartment door 20 along the length 30 of the compartment door 20 when the compartment door 20 is between the closed position 28 and the open position 26.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A key catcher for a storage unit including a trim panel, a compartment housing connected to the trim panel, and an openable compartment door connected to the compartment housing and having a length and an outer surface, the key catcher comprising:
   a sweeper connected to the compartment housing and configured to conform to the outer surface of the compartment door along the length of the compartment door; and
   a biasing member connected to the compartment housing and the sweeper and configured to urge the sweeper toward the outer surface of the compartment door;
   wherein the sweeper contacts the outer surface of the compartment door along the length of the compartment door when the compartment door is in an open position, a closed position, and any position between the open and closed positions such that a small item, such as a key, credit card, or change, cannot fall between the openable door and the trim panel.

2. The key catcher of claim 1, wherein the sweeper extends across a gap formed between the compartment door and the trim panel.

3. The key catcher of claim 1, wherein the sweeper includes a bar portion;
   wherein the bar portion of the sweeper is configured to conform to the outer surface of the compartment door along the length of the compartment door; and
   wherein the bar portion of the sweeper contacts the outer surface of the compartment door along the length of the compartment door when the compartment door is in the open position, the closed position, and any position between the open and closed positions.

4. The key catcher of claim 1, wherein the sweeper includes a door contact portion;
   wherein the door contact portion is configured to conform to the outer surface of the compartment door along the length of the compartment door;
   wherein the door contact portion contacts the outer surface of the compartment door along the length of the compartment door when the compartment door is in the open position, the closed position, and any position between the open and closed positions; and
   wherein the door contact portion of the sweeper is made of a non-metal material.

5. The key catcher of claim 4, wherein the non-metal material of the door contact portion of the sweeper is further defined as a rubber material.

6. The key catcher of claim 1, wherein the sweeper includes a guide arm portion having a first guide feature;
   wherein the compartment housing includes a second guide feature; and
   wherein the first guide feature, the second guide feature, and the biasing member cooperate such that the sweeper contacts the outer surface of the compartment door along the length of the compartment door when the compartment door is in the open position, the closed position, and any position between the open and closed positions.

7. The key catcher of claim 6, wherein one of the guide features is a rail; and
   wherein the other of the guide features is a channel configured to slide along the rail.

8. The key catcher of claim 1, wherein the sweeper includes first biasing member attachment feature;
   wherein the compartment housing includes a second biasing member attachment feature; and
   wherein the biasing member is connected to the first and second biasing member attachment features.

9. The key catcher of claim 8, wherein the biasing member is further defined as a compression coil spring.

10. A vehicle, comprising;
    a storage unit, including:
      a trim panel;
      a compartment housing connected to the trim panel; and
      an openable compartment door connected to the compartment housing via a hinge and having a length and an outer surface; and
    a key catcher, including:
      a sweeper connected to the compartment housing and configured to conform to the outer surface of the compartment door along the length of the compartment door; and
      a biasing member connected to the compartment housing and the sweeper and configured to urge the sweeper toward the outer surface of the compartment door;
    wherein the sweeper contacts the outer surface of the compartment door along the length of the compartment door when the compartment door is in an open position, a closed position, and any position between the open and closed positions such that a small item, such as a key, credit card, or change, cannot fall between the openable door and the trim panel.

11. The vehicle of claim 10, wherein the sweeper extends across a gap formed between the compartment door and the trim panel.

12. The vehicle of claim 10, wherein the sweeper includes a bar portion;
    wherein the bar portion of the sweeper is configured to conform to the outer surface of the compartment door along the length of the compartment door; and
    wherein the bar portion of the sweeper contacts the outer surface of the compartment door along the length of the compartment door when the compartment door is in the open position, the closed position, and any position between the open and closed positions.

13. The vehicle of claim 10, wherein the sweeper includes a door contact portion;
    wherein the door contact portion is configured to conform to the outer surface of the compartment door along the length of the compartment door;
    wherein the door contact portion contacts the outer surface of the compartment door along the length of the compartment door when the compartment door is in the open position, the closed position, and any position between the open and closed positions; and wherein the door contact portion of the sweeper is made of a non-metal material.

14. The vehicle of claim 13, wherein the non-metal material of the door contact portion of the sweeper is further defined as a rubber material.

15. The vehicle of claim 10, wherein the sweeper includes a guide arm portion having a first guide feature;

wherein the compartment housing includes a second guide feature; and wherein the first guide feature, the second guide feature, and the biasing member cooperate such that the sweeper contacts the outer surface of the compartment door along the length of the compartment door when the compartment door is in the open position, the closed position, and any position between the open and closed positions.

16. The vehicle of claim 15, wherein one of the guide features is a rail; and wherein the other of the guide features is a channel configured to slide along the rail.

17. The vehicle of claim 10, wherein the sweeper includes first biasing member attachment feature;

wherein the compartment housing includes a second biasing member attachment feature; and wherein the biasing member is connected to the first and second biasing member attachment features.

18. The vehicle of claim 17, wherein the biasing member is further defined as a compression coil spring.

* * * * *